(12) United States Patent
Iwano et al.

(10) Patent No.: US 9,487,238 B2
(45) Date of Patent: Nov. 8, 2016

(54) VEHICLE PARTING PORTION STRUCTURE AND MANUFACTURING METHOD THEREOF

(71) Applicant: TOYOTA JIDOSHA KABUSHIKI KAISHA, Toyota-shi, Aichi-ken (JP)

(72) Inventors: Yoshihiro Iwano, Toyota (JP); Junichi Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/434,431

(22) PCT Filed: Sep. 12, 2013

(86) PCT No.: PCT/JP2013/074759
§ 371 (c)(1),
(2) Date: Apr. 9, 2015

(87) PCT Pub. No.: WO2014/061382
PCT Pub. Date: Apr. 24, 2014

(65) Prior Publication Data
US 2015/0266512 A1  Sep. 24, 2015

(30) Foreign Application Priority Data
Oct. 19, 2012  (JP) ................. 2012-232036

(51) Int. Cl.
*B62D 25/02* (2006.01)
*B62D 25/04* (2006.01)
(Continued)

(52) U.S. Cl.
CPC ............ *B62D 25/02* (2013.01); *B62D 25/025* (2013.01); *B62D 25/04* (2013.01); *B62D 25/12* (2013.01);
(Continued)

(58) Field of Classification Search
CPC ............ Y10T 29/49925; B62D 25/12; B62D 25/126; B62D 25/02; B62D 25/04; B62D 25/025; B62D 25/18
USPC ............................................. 296/191; 29/515
See application file for complete search history.

(56) References Cited

U.S. PATENT DOCUMENTS

| 1,643,743 A * | 9/1927 | Ledwinka ............ B62D 25/00 296/192 |
| 8,007,037 B2 * | 8/2011 | Wolkersdorfer ....... B60K 11/08 296/193.05 |

(Continued)

FOREIGN PATENT DOCUMENTS

| JP | S64-36290 U | 3/1989 |
| JP | H11-222154 A | 8/1999 |

(Continued)

*Primary Examiner* — Pinel Romain
(74) *Attorney, Agent, or Firm* — Oliff PLC (57) ABSTRACT

In a side member outer panel, a second panel portion is formed contiguously to a first panel portion with first ridge line interposed therebetween, and third panel portion is formed contiguously to second panel portion with second ridge line intersecting first ridge line at an acute angle interposed therebetween. A bead with a V shaped cross-section, formed by part of first panel portion and part of third panel portion, extends from an intersection point of the first and second ridge lines. A hood outer panel is disposed along the first ridge line, with a first parting portion formed between the hood outer panel and the second panel portion. A fender panel is disposed along the second ridge line, with a second parting portion formed between the fender panel and the second panel portion and with a third parting portion formed between the fender panel and a hood.

5 Claims, 6 Drawing Sheets (51) Int. Cl.
*B62D 25/16* (2006.01)
*B62D 25/12* (2006.01)
*B62D 25/18* (2006.01)
*B62D 65/02* (2006.01)

(52) U.S. Cl.
CPC ............... *B62D 25/16* (2013.01); *B62D 25/18* (2013.01); *B62D 65/024* (2013.01); *Y10T 29/49925* (2015.01)

(56) References Cited

U.S. PATENT DOCUMENTS

2003/0140566 A1* 7/2003 Sommer ............... B60J 5/0406
49/502

2009/0189417 A1    7/2009  Wolkersdorfer
2012/0075879 A1    3/2012  Uematsu et al.
2013/0106089 A1*   5/2013  Balasundaramohan ..................
B62D 25/18
280/851

FOREIGN PATENT DOCUMENTS

| JP | 2003-216685 A | 7/2003 |
| JP | 2005-096502 A | 4/2005 |
| JP | 2007-160787 A | 6/2007 |
| JP | 2010-285005 A | 12/2010 |
| JP | 2012-116235 A | 6/2012 |

* cited by examiner

VEHICLE PARTING PORTION STRUCTURE AND MANUFACTURING METHOD THEREOF

TECHNICAL FIELD

The present invention relates to a vehicle parting portion structure and a manufacturing method thereof.

BACKGROUND ART

Plural panels are adjacently disposed in vehicles, with a parting portion (boundary line) formed between respective panels (see, for example, Japanese Patent Application Laid-Open (JP-A) No. 2005-096502 and JP-A No. 2010-285005). Such parting portions sometimes contribute to improving the external appearance.

RELATED DOCUMENTS

List of Related Patent Documents

Japanese Patent Application Laid-Open (JP-A) No. 2005-096502
JP-A No. 2010-285005

SUMMARY OF INVENTION

Technical Problem

However, when, for example, a space having an acute angle is formed as a corner portion that is interposed between end portions of two panels and a rounded profile corner portion is formed by drawing another panel, with the rounded profile corner portion disposed inside the acute angle shaped corner portion space, then a hole shaped gap is formed between those panels. This lowers quality of the external appearance. In cases in which a rounded profile corner portion with a shallow drawing depth is foamed to the panel, and the rounded profile corner portion is covered by and joined to a separate cover, that is fit to the acute angle shaped corner portion space, in order to hide such a hole shaped gap, the strength of the panel is lowered since the panel has the shallow drawing depth.

In consideration of the above circumstances, a subject of the present invention is to obtain a vehicle parting portion structure and a manufacturing method thereof that can improve the external appearance while securing a specific strength.

Solution to Subject

A vehicle parting portion structure according to a first aspect of the present invention includes: a first panel that includes a first panel portion, a second panel portion formed contiguously to the first panel portion with a first ridge line interposed therebetween, a third panel portion formed contiguously to the second panel portion with a second ridge line, that intersects the first ridge line at an acute angle, interposed therebetween, and a bead having a V shaped cross-section, configured by part of the first panel portion and part of the third panel portion, and extending from an intersection point of the first ridge line and the second ridge line; a second panel that is disposed along the first ridge line with a first parting portion formed between the second panel and the second panel portion; and a third panel that is disposed along the second ridge line with a second parting portion formed between the third panel and the second panel portion, and with a third parting portion formed between the third panel and the second panel.

In the vehicle parting portion structure according to the first aspect of the present invention, in the first panel, the second panel portion is formed contiguously to the first panel portion with the first ridge line interposed therebetween, and the third panel portion is formed contiguously to the second panel portion with the second ridge line, that intersects the first ridge line at an acute angle, interposed therebetween. Moreover, the V shaped cross-section bead configured by part of the first panel portion and part of the third panel portion and extends from the intersection point of the first ridge line and the second ridge line. Namely, the first panel forms a shape that enables manufacture of a corner portion having an acute angle and interposed between the first ridge line and the second ridge line by bend processing.

The second panel is disposed along the first ridge line and forms the first parting portion between the second panel and the second panel portion, and the third panel is disposed along the second ridge line and forms the second parting portion between the third panel and the second panel portion, and further forms the third parting portion between the third panel and the second panel. As explained above, since the first panel forms the acute angle shaped corner portion, formation of a hole shaped gap between the first panel, the second panel, and the third panel in the vicinity of the intersection point of the first ridge line and the second ridge line can be prevented. Since the excellent external appearance is secured without covering the first panel with a cover, there is no need to reduce the depth dimension of the first panel as viewed from the second panel portion as the apex. In other words, there is no need to use such a first panel having a cross-section shape that would reduce the strength of the first panel. This enables the strength of the first panel to be easily secured.

A second aspect of the present invention is the vehicle parting portion structure according to the first aspect, wherein the bead extends along the extension direction of either the first ridge line or the second ridge line.

In the vehicle parting portion structure according to the second aspect of the present invention, the bead extends along the extension direction of either the first ridge line or the second ridge line. Thus, even if the bead is visible through the gap of the third parting portion, the bead appears as a line that is contiguous to one of the ridge lines. The appearance is therefore good.

A third aspect of the present invention is the vehicle parting portion structure of the first aspect or the second aspect, wherein the first panel forms a side member outer panel configuring a vehicle body side section, the second panel forms a hood panel covering a vehicle front portion from the upper side, and the third panel forms a fender panel disposed at a side face of a vehicle body front section.

In the vehicle parting portion structure according to the third aspect of the present invention, the first panel forms the side member outer panel configuring the vehicle body side section, the second panel forms the hood panel covering the vehicle front portion from the upper side, and the third panel forms the fender panel disposed at the side face of the vehicle body front section. Since the side member outer panel is a large panel member, it is difficult to form a corner portion having an acute angle. However, in the prevent invention, since the shape can be manufactured by bend processing, the acute angle shaped corner portion can be easily formed at the side member outer panel. Moreover the parting portion of the side member outer panel and the hood, and the parting portion of the side member outer panel and the fender panel are locations that are liable to be visible. However, in the present invention, since there is no hole shaped gap formed in the vicinity of the intersection point of each of the parting portions, the excellent external appearance is secured. Furthermore, locations of the side member outer panel adjacent to the hood and the fender panel are locations that contribute to collision performance. Since the strength of these locations is easily secured by securing external appearance in which a cover is not used at the side member outer panel, a specific collision performance can easily be obtained.

A method of manufacturing a vehicle parting portion structure according to a fourth aspect of the present invention includes a first process of folding a first vehicle outer panel member to form a first outer panel configuration portion and a second outer panel configuration portion with a first fold line interposed therebetween, a second process of folding the second outer panel configuration portion along a line intersecting the first fold line at an acute angle such that a third outer panel configuration portion is formed by part of the second outer panel configuration portion between a second fold line along the line and the first fold line, and a fourth outer panel configuration portion is formed by another part of the second outer panel configuration portion so as to be contiguous to the third outer panel configuration portion with the second fold line interposed therebetween, a third process of disposing a second vehicle outer panel along one of the first fold line or the second fold line and at a position forming a first parting portion between the second vehicle outer panel and the third outer panel configuration portion, and a fourth process of disposing a third vehicle outer panel along the other of the first fold line or the second fold line and at a position forming a second parting portion between the third vehicle outer panel and the third outer panel configuration portion. The third vehicle outer panel is moreover disposed at a position forming a third parting portion between the third vehicle outer panel and the second vehicle outer panel.

In the method of manufacturing a vehicle parting portion structure according to the fourth aspect of the present invention, in the first process, the first vehicle outer panel member is folded to form the first outer panel configuration portion and the second outer panel configuration portion with the first fold line interposed therebetween. In the second process, the second outer panel configuration portion is folded along the line intersecting the first fold line at an acute angle so as to form the third outer panel configuration portion by part of the second outer panel configuration portion between the second fold line along the line and the first fold line, and to form the fourth outer panel configuration portion by another part of the second outer panel configuration portion so as to be contiguous to the third outer panel configuration portion with the second fold line interposed therebetween. In the third process, the second vehicle outer panel is disposed along one of the first fold line or the second fold line and at a position forming the first parting portion between the second panel and the third outer panel configuration portion. In the fourth process, the third vehicle outer panel is disposed along the other of the first fold line or the second fold line and at a position forming the second parting portion between the third vehicle outer panel and the third outer panel configuration portion. The third vehicle outer panel is moreover disposed at a position forming the third parting portion between the third vehicle outer panel and the second vehicle outer panel. This thereby enables a hole shaped gap to be prevented from forming between the first vehicle outer panel, the second vehicle outer panel, and the third vehicle outer panel in the vicinity of the intersection point of the first fold line and the second fold line. Since the excellent external appearance is secured without covering the first vehicle outer panel with a cover, there is no need to reduce the depth dimension of the first vehicle outer panel as viewed from the third outer panel configuration portion as the apex. In other words, there is no need to set the first vehicle outer panel to have a cross-section shape that would reduce the strength of the first vehicle outer panel. This thereby enables the strength of the first vehicle outer panel to be easily secured.

Advantageous Effects of Invention

As explained above, the vehicle parting portion structure according to the first aspect of the present invention has an excellent advantageous effect of enabling the external appearance to be improved while securing a specific strength.

The vehicle parting portion structure according to the second aspect of the present invention has an excellent advantageous effect of enabling the external appearance to be improved by making the bead appear as part of the styling.

The vehicle parting portion structure according to the third aspect of the present invention has an excellent advantageous effect of enabling the external appearance to be improved at a location where the side member outer panel, the hood, and the fender panel are adjacently disposed, while securing a specific strength.

The method of manufacturing a vehicle parting portion structure according to the fourth aspect of the present invention has an excellent advantageous effect of enabling the external appearance to be improved while securing a specific strength for the manufactured vehicle parting portion structure.

DESCRIPTION OF EMBODIMENTS

First Exemplary Embodiment

Explanation follows regarding a vehicle parting portion structure and manufacturing method according to a first exemplary embodiment of the present invention, using FIG. 1 to FIG. 4C. Note that in these drawings, the arrow FR indicates the vehicle front side, the arrow UP indicates the vehicle upper side, and the arrow IN indicates the vehicle width direction inside as appropriate.

Vehicle Parting Portion Structure

Figure 1:
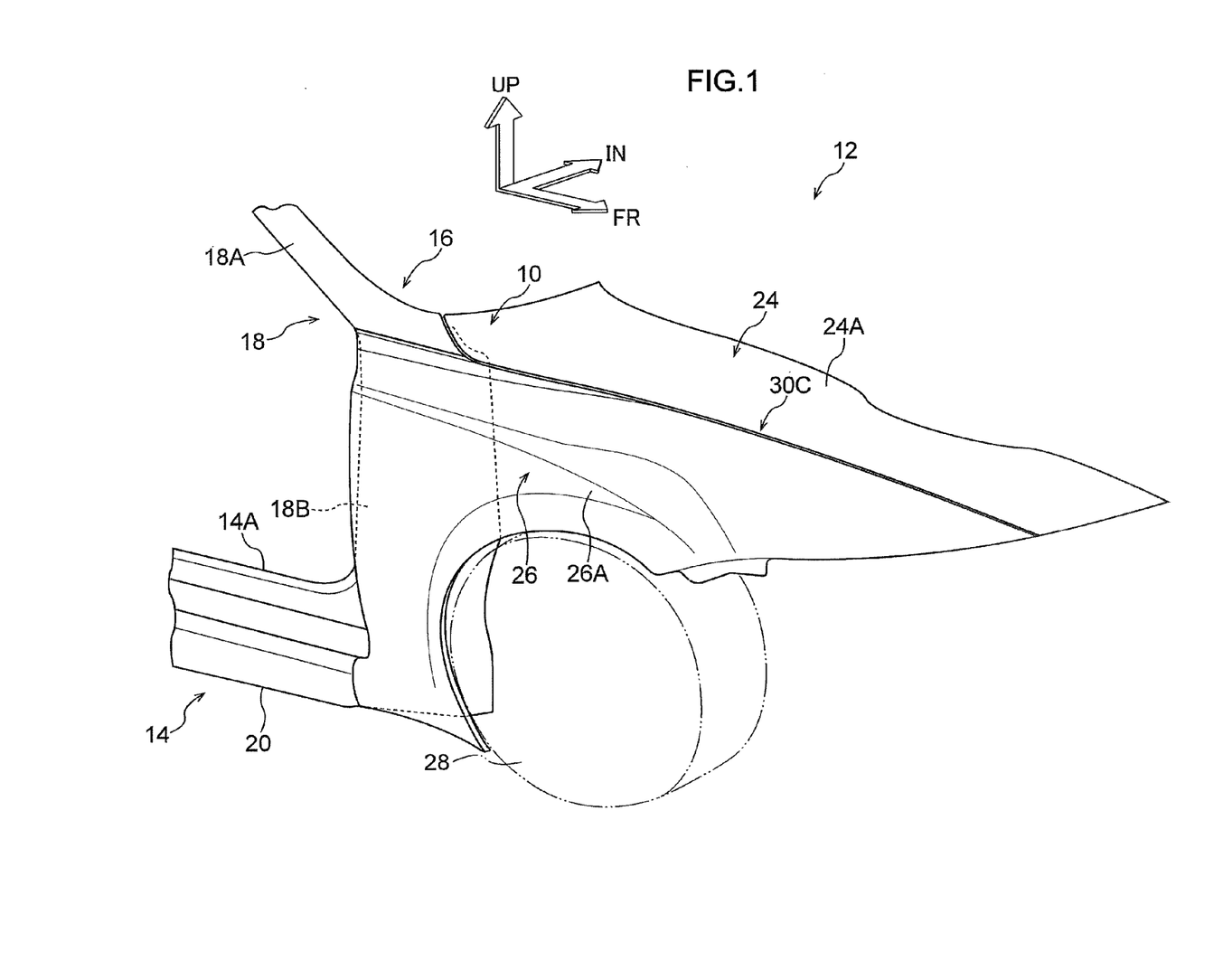
FIG. 1 is a perspective view illustrating a vehicle front section applied with a vehicle parting portion structure according to a first exemplary embodiment of the present invention.

FIG. 1 illustrates a perspective view of part of a vehicle front section 12, with a vehicle parting portion structure 10 according to the first exemplary embodiment applied to the vehicle front section 12. A brief explanation first follows regarding the vehicle structure including the vehicle parting portion structure 10, with reference to FIG. 1.

As illustrated in FIG. 1, a front portion of a side member outer panel (also referred to as "side outer panel") 16 serving as a first panel configuring a vehicle body side section 14 is disposed at the vehicle front section 12. The front portion of the side member outer panel 16 configures an outer panel portion of a front pillar 18 at the front side of a door opening 14A at the front side of the vehicle body side section 14.

An upper pillar portion 18A that is an upper portion of the front pillar 18 is disposed at each width direction end of a front windshield (not illustrated in the drawings), sloping toward the vehicle upper side while heading toward the vehicle rear side. An upper end portion of the upper pillar portion 18A is joined to a front end of a roof side rail portion (not illustrated in the drawings), and the roof side rail portion extends substantially along the vehicle front-rear direction at each side of a roof (not illustrated in the drawings). A lower pillar portion 18B that is a lower portion of the front pillar 18 drops down substantially vertically from a lower end portion of the upper pillar portion 18A toward the vehicle lower side. A lower end portion of the lower pillar portion 18B is joined to a front end of a rocker portion 22 (also referred to as a "side sill"), and the rocker portion 22 extends along the vehicle front-rear direction at both sides of a vehicle body floor (not illustrated in the drawings). Both ends of a cowl (not illustrated in the drawings) extending along the vehicle width direction at a lower edge of the front windshield are joined to respective inner faces at upper end sides of the pair of left and right lower pillar portions 18B.

A hood 24 is provided at the vehicle front side of the cowl. The hood 24 is an opening-closing door that covers an engine room (not illustrated in the drawings) of the vehicle front section 12 from the upper side. The hood 24 is configured including an outer hood panel 24A serving as a second panel and as a hood panel, and an inner hood panel (not illustrated in the drawings) disposed at the hood lower side with respect to the outer hood panel 24A and configuring the inner panel of the hood 24. An outer peripheral portion of the outer hood panel 24A is joined to the inner hood panel by hemming processing. Lower face portions of both sides in the vehicle width direction at a rear end side of the hood 24 are attached by hood hinges (not illustrated in the drawings) to an apron upper member (not illustrated in the drawings) that is a vehicle body framework member. As described in detail later, both sides in the vehicle width direction at the rear end portion of the hood 24 are disposed adjacently to respective lower end portions of the upper pillar portions 18A.

A fender panel (also referred to as a "front fender panel") 26, serving as a third panel, is disposed at a side face of a vehicle front section that is located at the side of the hood 24. A third parting portion 30C forming a boundary portion between the outer hood panel 24A and the fender panel 26 extends substantially along the vehicle front-rear direction. The fender panel 26 includes an outer wall 26A disposed at the upper side of a front wheel 28 and the surrounding portion thereof and configuring a styling face, and an inner wall (not illustrated in the drawings) curving to the lower side from the third parting portion 30C between the outer wall 26A and the outer hood panel 24A. The inner wall of the fender panel 26 curves toward the vehicle width direction inside at a lower end portion, and is attached to the apron upper member.

Figure 2:
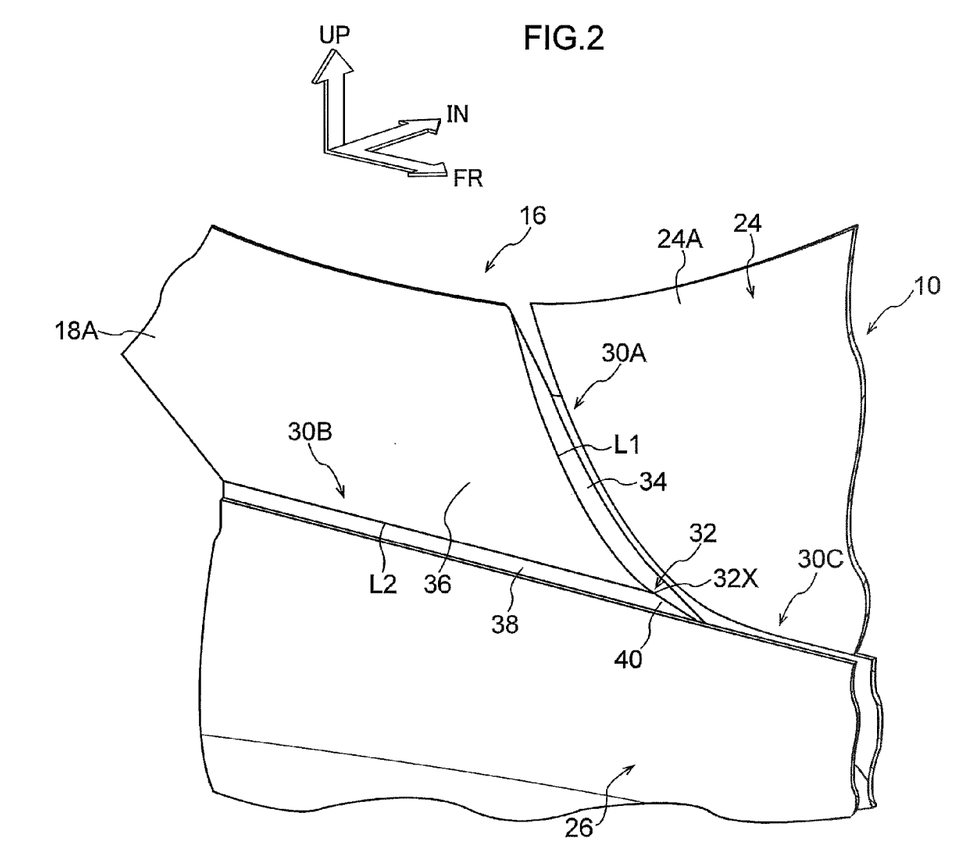
FIG. 2 is a perspective view illustrating an enlargement of the parting portion structure in FIG. 1.
Figure 3:
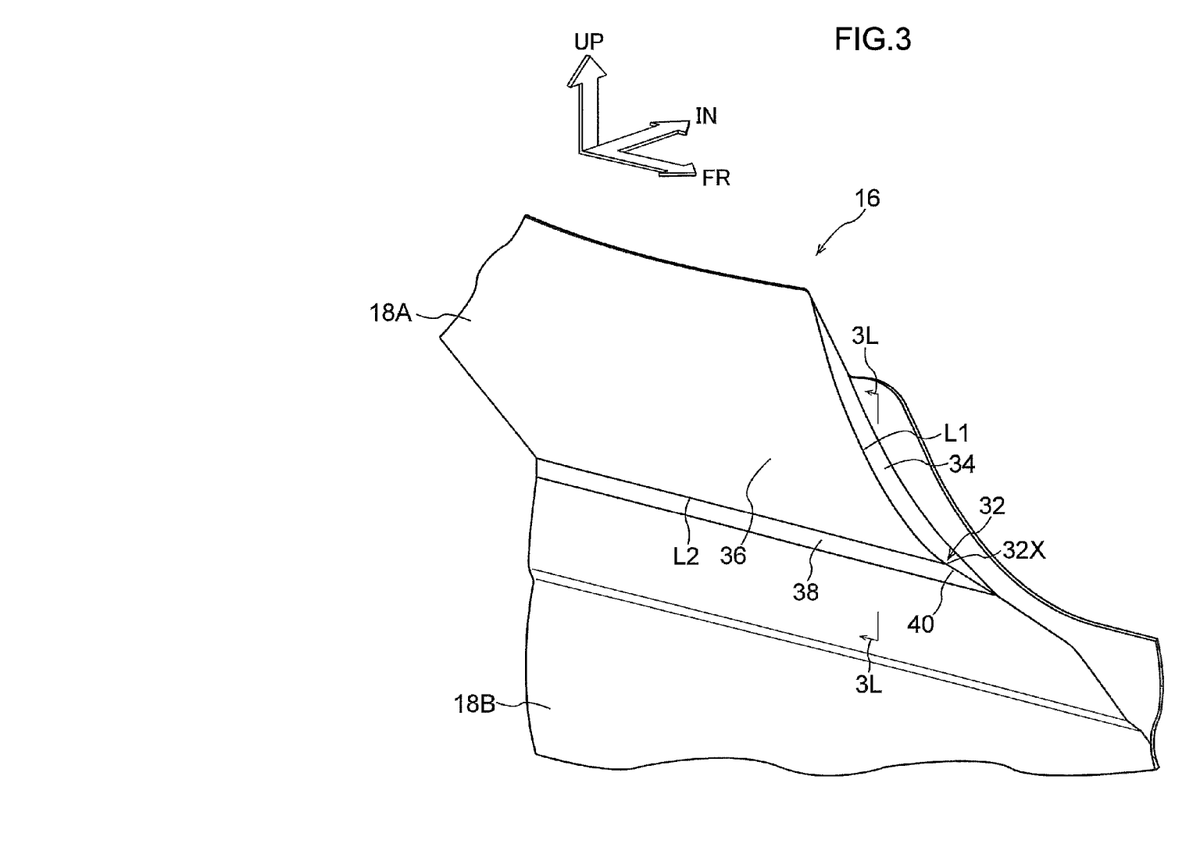
FIG. 3 is a perspective view illustrating a state in which the hood and the fender panel in FIG. 2 are removed.

Detailed explanation follows regarding the vehicle parting portion structure 10, with reference to FIG. 2 and FIG. 3. FIG. 2 is an enlarged perspective view illustrating the vehicle parting portion structure 10 in FIG. 1. FIG. 3 is a perspective view illustrating a state in which the hood 24 and the fender panel 26 have been removed from FIG. 2.

As illustrated in FIG. 3, the side member outer panel 16 includes a corner portion 32 having an acute angle shape at a lower end front side of the upper pillar portion 18A. The corner portion 32 is formed interposed between a first ridge line L1 sloping toward the vehicle lower side at the vehicle front side, and a second ridge line L2 extending in the vehicle front-rear direction and intersecting with the first ridge line L1 so as to form the acute angle shape. A cross-section shape of the side member outer panel 16, sectioned along the line 3L-3L in FIG. 3 that is slightly further to the vehicle rear side than an intersection point 32X of the first ridge line L1 and the second ridge line L2, forms a hat shape open toward the vehicle width direction inside and is provided with upper and lower flanges.

The first ridge line L1 forms a boundary portion between a first panel portion 34 disposed at a lower end front face of the upper pillar portion 18A, and a second panel portion 36 disposed at a lower end side face of the upper pillar portion 18A. In other words, a bent shape is formed by the first panel portion 34 and the second panel portion 36. Note that, in the present exemplary embodiment, the first ridge line L1 is a curved line that is slightly inflected toward the vehicle lower rear side, and not a straight line. The first panel portion 34 slopes toward the vehicle lower side at the vehicle front side, inflecting slightly toward the vehicle lower rear side, and the panel face thereof faces at an angle toward the vehicle front upper side. The second panel portion 36 is contiguously formed to the first panel portion 34 with the first ridge line L1 interposed therebetween, and the panel face thereof faces substantially toward the vehicle width direction outside.

The second ridge line L2 forms a boundary portion between the second panel portion 36 previously described, and a third panel portion 38 disposed at the lower side of the second panel portion 36. In other words, a bent shape is formed by the second panel portion 36 and the third panel portion 38. The third panel portion 38 is disposed at a position adjacent to the lower pillar portion 18B at the lower end portion of the upper pillar portion 18A, and is contiguously formed to the second panel portion 36 with the second ridge line L2 interposed therebetween. The third panel portion 38 extends in the vehicle front-rear direction, and the panel face thereof faces toward the vehicle width direction outside, angled toward the vehicle lower side.

The side member outer panel 16 includes a bead 40 that extends at an angle toward the vehicle lower side while being inclined to the vehicle front side from the intersection point 32X of the first ridge line L1 and the second ridge line L2. The bead 40 is configured by part of the first panel portion 34 and part of the third panel portion 38, forms a V shaped cross-section, and extends along the extension direction of the first ridge line L1. An apex portion ridge line of the bead 40 is gradually positioned toward the vehicle width direction inside on progression away from the intersection point 32X of the first ridge line L1 and the second ridge line L2. Namely, the protruding direction height of the bead 40 gradually decreases on progression away from the intersection point 32X of the first ridge line L1 and the second ridge line L2.

As illustrated in FIG. 2, each side in the vehicle width direction of the outer hood panel 24A at the rear end portion thereof is disposed running along the first ridge line L1, and form a first parting portion 30A between the hood outer panel 24A and the second panel portion 36 of the side member outer panel 16. A rear end portion of the fender panel 26 at an upper end portion thereof is disposed running along the second ridge line L2, and forms a second parting portion 30B between the fender panel 26 and the second panel portion 36 of the side member outer panel 16. As previously described, a location of the fender panel 26 excluding the rear end portion at the upper end portion thereof forms the third parting portion 30C between the fender panel 26 and the outer hood panel 24A.

Manufacturing Method, Operation and Advantageous Effects

Figure 4A:
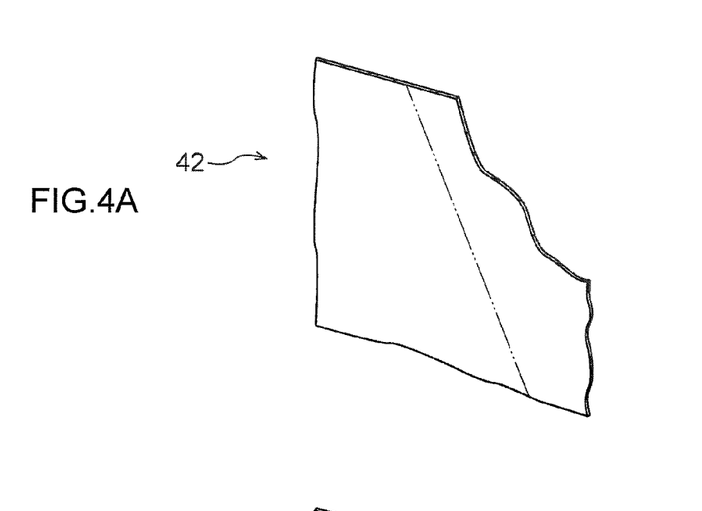
FIG. 4A is a simplified illustration of part of a method of manufacturing a vehicle parting portion structure according to the first exemplary embodiment of the present invention. A state prior to folding a panel material (prior to a first process) is illustrated, together with a scheduled fold line.
Figure 4B:
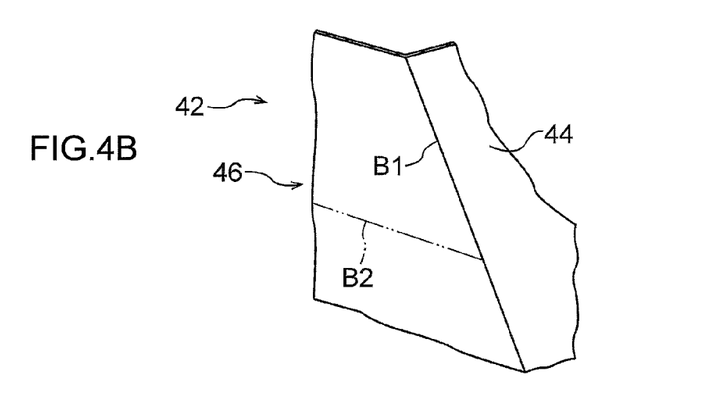
FIG. 4B is a simplified illustration of part of a method of manufacturing a vehicle parting portion structure according to the first exemplary embodiment of the present invention. A state in which a panel material has been folded in a first process is illustrated.
Figure 4C:
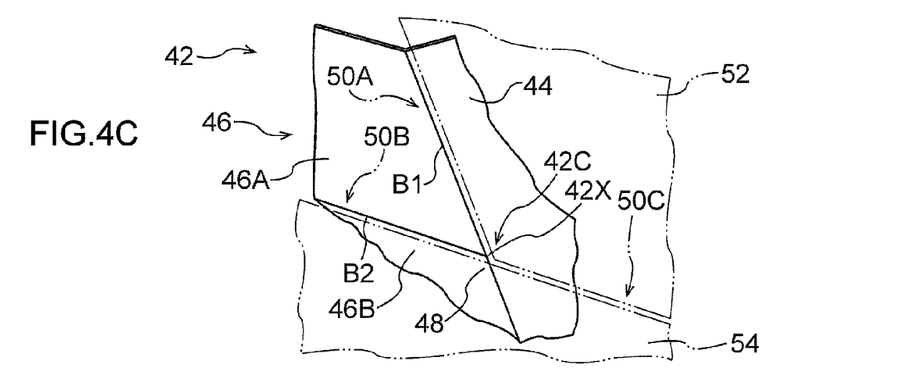
FIG. 4C is a simplified illustration of part of a method of manufacturing a vehicle parting portion structure according to the first exemplary embodiment of the present invention. A state in which a panel material has been folded in a second process is illustrated.

Explanation follows regarding a method of manufacturing the vehicle parting portion structure, as well as operation and advantageous effects of the above exemplary embodiment, with reference to FIG. 4A to FIG. 4C. A drawing process is first performed during manufacture of the vehicle parting portion structure. Although illustration and detailed explanation of the drawing process is omitted herein, to explain briefly, the drawing process is performed on a first vehicle outer panel material 42 (see FIG. 4A) to form a specific styling face of the side member outer panel 16 (see FIG. 1).

Next, a bending process is performed, as illustrated in FIG. 4A to FIG. 4C. Note that, although the specific drawing process has already been performed on the first vehicle outer panel material 42 that is subject to the bending process, in FIG. 4A to FIG. 4C, the shape formed by the drawing process has been replaced with a simple flat panel shape in order to facilitate understanding of the bending process.

In the bending process, the first vehicle outer panel material 42 illustrated in FIG. 4A is folded, as illustrated in FIG. 4B. A first outer panel configuration portion 44 and a second outer panel configuration portion 46 are thereby formed, with a first fold line B1 interposed therebetween (a first process).

Next, as illustrated in FIG. 4C, the second outer panel configuration portion 46 illustrated in FIG. 4B is folded along a line intersecting the first fold line B1 so as to form an acute angle therebetween (see the double-dotted dashed line B2). As a result, part of the second outer panel configuration portion 46 forms a third outer panel configuration portion 46A formed between the second fold line B2 running along the line described above and the first fold line B1, and another part of the second outer panel configuration portion 46 forms a fourth outer panel configuration portion 46B that is contiguous to the third outer panel configuration portion 46A with the second fold line B2 interposed therebetween (a second process).

An acute angle corner portion 42C is formed, and a bead 48 is formed at an intersection point 42X of the first fold line B1 and the second fold line B2 as a result. The bead 48 is configured by part of the first outer panel configuration portion 44 and part of the fourth outer panel configuration portion 46B, and forms a V shaped cross-section. In the present exemplary embodiment, since the first fold line B1 is folded before the second fold line B2, the bead 48 extends along the extension direction of the first fold line B1.

Next, bending processing is performed at locations of the side member outer panel 16 where draw bending processing is required; however detailed explanation is omitted herein.

Next, a second vehicle outer panel 52 is disposed at a position along the first fold line B1 so as to form a first parting portion 50A with the third outer panel configuration portion 46A illustrated in FIG. 4C (a third process), and the second vehicle outer panel 52 is attached to an attachment target. In the present exemplary embodiment, the second vehicle outer panel 52 forms the outer hood panel 24A of the hood 24 (see FIG. 2).

Next, a third vehicle outer panel 54 is disposed at a position running along the second fold line B2 so as to form a second parting portion 50B between the third vehicle outer panel 54 and the third outer panel configuration portion 46A and further form a third parting portion 50C between the third vehicle outer panel 54 and the second vehicle outer panel 52 (a fourth process), and the third vehicle outer panel 54 is attached to an attachment target. In the present exemplary embodiment, the third vehicle outer panel 54 forms the fender panel 26 (see FIG. 2).

Supplementary explanation follows regarding the corresponding relationships between the configuration portions illustrated in FIG. 4C and the configuration portions illustrated in FIG. 2, with reference to FIG. 4C and FIG. 2. The first outer panel configuration portion 44 in FIG. 4C corresponds to the first panel portion 34 in FIG. 2, the third outer panel configuration portion 46A in FIG. 4C corresponds to the second panel portion 36 in FIG. 2, and the fourth outer panel configuration portion 46B in FIG. 4C corresponds to the third panel portion 38 in FIG. 2. The first fold line B1 in FIG. 4C corresponds to the first ridge line L1 in FIG. 2, the second fold line B2 in FIG. 4C corresponds to the second ridge line L2 in FIG. 2, the corner portion 42C in FIG. 4C corresponds to the corner portion 32 in FIG. 2, and the bead 48 in FIG. 4C corresponds to the bead 40 in FIG. 2.

The vehicle parting portion structure 10 illustrated in FIG. 2 is manufactured in this manner. The acute angle shaped corner portion 32 interposed between the first ridge line L1 and the second ridge line L2 at the lower end portion of the upper pillar portion 18A of the side member outer panel 16 is accordingly a shape that can be manufactured by bend processing. This enables a hole shaped gap to be prevented from forming between the side member outer panel 16, the outer hood panel 24A and the fender panel 26, in the vicinity of the intersection point 32X of the first ridge line L1 and the second ridge line L2.

The excellent external appearance is accordingly secured without covering the lower end portion of the upper pillar portion 18A of the side member outer panel 16 with a cover. Since no cover is required, there is no need to reduce the depth dimension at the lower end portion of the upper pillar portion 18A of the side member outer panel 16 as viewed from the second panel portion 36 as the apex. In other words, there is no need to form a cross-section shape that would reduce the strength at the lower end portion of the upper pillar portion 18A of the side member outer panel 16. This enables a specific strength of the upper pillar portion 18A to be easily secured. This accordingly enables settings to be easily made in order to secure performance in the event of a front face collision or a side face collision, driving stability, and noise and vibration performance (performance to suppress vibration and vibration noise (NV performance)).

In the vehicle parting portion structure 10 of the present exemplary embodiment, the bead 40 extends along the extension direction of the first ridge line L1. As a result, even if the bead 40 is visible in the gap at the third parting portion 30C between the outer hood panel 24A and the fender panel 26, the bead 40 appears as a line that is contiguous to the first ridge line L1. Namely, the bead 40 can be presented as a part of the styling, creating a good appearance.

As explained above, the present exemplary embodiment enables the external appearance to be improved, while securing a specific strength for the manufactured vehicle parting portion structure 10. The present exemplary embodiment also enables flexibility for styling to be increased.

Modified Examples of First Exemplary Embodiment

Explanation follows regarding modified examples of the first exemplary embodiment.

As a modified example of the above exemplary embodiment, the vehicle outer panel illustrated by the reference numeral 54 in FIG. 4C may be disposed as the second vehicle outer panel in the third process, and the vehicle outer panel illustrated by the reference numeral 52 in FIG. 4C may be disposed as the third vehicle outer panel in the fourth process. To elaborate on FIG. 4C and explain specifically, first, in the third process, the second vehicle outer panel (54) is disposed at a position running along the second fold line B2 so as to form the first parting portion (50B) between the second vehicle outer panel (54) and the third outer panel configuration portion (46A) and the second vehicle outer panel (54) is attached to the attachment target. Next, in the fourth process, the third vehicle outer panel (52) is disposed at a position running along the first fold line (B1) so as to form the second parting portion (50A) between the third vehicle outer panel (52) and the third outer panel configuration portion (46A) and further form the third parting portion (50C) between the third vehicle outer panel (52) and the second vehicle outer panel (54), and the third vehicle outer panel (52) is attached to the attachment target.

As illustrated in FIG. 3, in the above exemplary embodiment, the bead 40 extends along the extension direction of the first ridge line L1; however the bead may be a bead that extends along the extension direction of the second ridge line (L2). In order to realize such a configuration, the folding sequence in the manufacturing method of the above exemplary embodiment may be reversed, as illustrated in FIG. 5A to FIG. 5C.

Figure 5A:
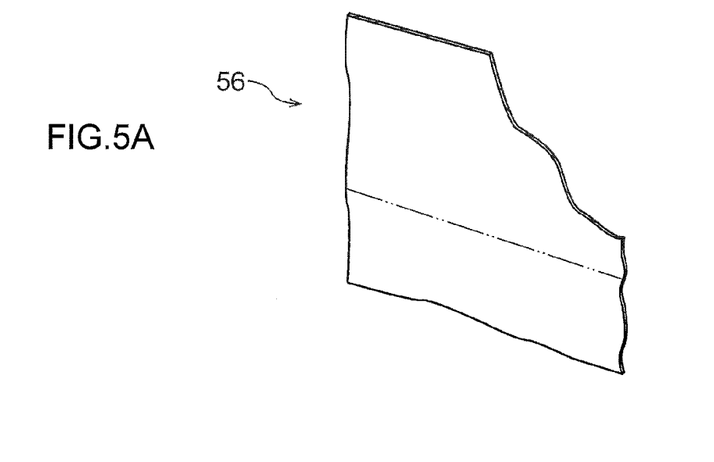
FIG. 5A is a simplified illustration of part of a method of manufacturing a vehicle parting portion structure according to a modified example of the first exemplary embodiment of the present invention. A state prior to folding a panel material (prior to a first process) is illustrated, together with a scheduled fold line.
Figure 5B:
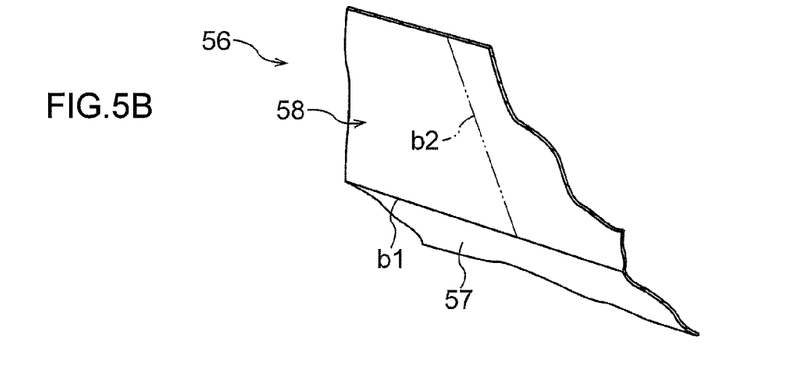
FIG. 5B is a simplified illustration of part of a method of manufacturing a vehicle parting portion structure according to a modified example of the first exemplary embodiment of the present invention. A state in which a panel material has been folded in a first process is illustrated.

Namely, in the bending process of the modified example, first, as illustrated in FIG. 5B, a first vehicle outer panel material 56 (for forming the side member outer panel 16 (see FIG. 1)) illustrated in FIG. 5A is bent. A first outer panel configuration portion 57 and a second outer panel configuration portion 58 are thereby formed, with a first fold line b1 interposed therebetween (first process). Next, as illustrated in FIG. 5C, the second outer panel configuration portion 58 illustrated in FIG. 5B is folded along a line intersecting the first fold line b1 at an acute angle (see the double-dotted dashed line b2). As a result, part of the second outer panel configuration portion 58 forms a third outer panel configuration portion 58A formed between the second fold line b2 running along the line described above and the first fold line b1, and another part of the second outer panel configuration portion 58 configures a fourth outer panel configuration portion 58B that is contiguous to the third outer panel configuration portion 58A with the second fold line b2 interposed therebetween (second process). An acute angle corner portion 56C is formed, and a bead 59 is formed at an intersection point 56X of the first fold line b1 and the second fold line b2 as a result. The bead 59 is configured by part of the first outer panel configuration portion 57 and part of the fourth outer panel configuration portion 58B forming a V shaped cross-section, and extends along the extension direction of the first fold line b1.

Figure 5C:
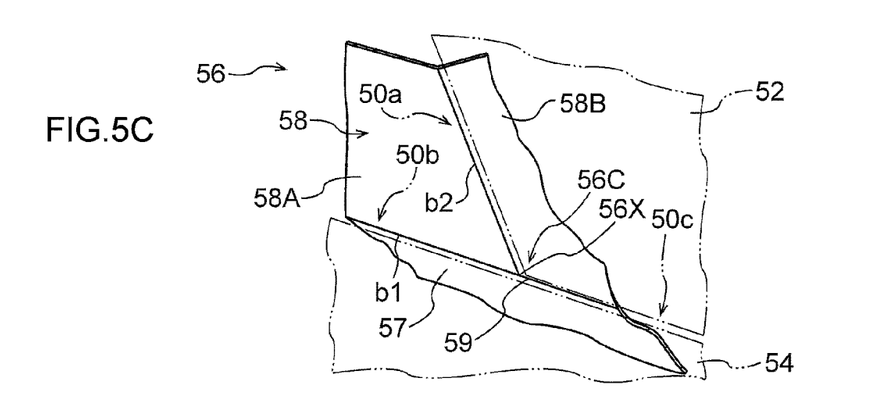
FIG. 5C is a simplified illustration of part of a method of manufacturing a vehicle parting portion structure according to a modified example of the first exemplary embodiment of the present invention. A state in which a panel material has been folded in a second process is illustrated.

Next, the second vehicle outer panel 52 is disposed at a position running along the second fold line b2 so as to form a first parting portion 50a between the second vehicle outer panel 52 and the third outer panel configuration portion 58A illustrated in FIG. 5C (third process), and the second vehicle outer panel 52 is attached to the attachment target. Next, the third vehicle outer panel 54 is disposed at a position running along the first fold line b1 so as to form a second parting portion 50b between the third vehicle outer panel 54 and the third outer panel configuration portion 58A and further form a third parting portion 50c between the third vehicle outer panel 54 and the second vehicle outer panel 52 (fourth process), and the third vehicle outer panel 54 is attached to the attachment target.

Supplementary explanation follows regarding the corresponding relationships between the configuration portions illustrated in FIG. 5C and the configuration portions illustrated in FIG. 2, with reference to FIG. 5C and FIG. 2. The first outer panel configuration portion 57 in FIG. 5C corresponds to the third panel portion 38 in FIG. 2, the third outer panel configuration portion 58A in FIG. 5C corresponds to the second panel portion 36 in FIG. 2, and the fourth outer panel configuration portion 58B in FIG. 5C corresponds to the first panel portion 34 in FIG. 2. The first fold line b1 in FIG. 5C corresponds to the second ridge line L2 in FIG. 2, the second fold line b2 in FIG. 5C corresponds to the first ridge line L1 in FIG. 2, and the corner portion 56C in FIG. 5C corresponds to the corner portion 32 in FIG. 2.

As a further modified example, the vehicle outer panel illustrated by the reference numeral 54 in FIG. 5C may be disposed as the second vehicle outer panel in the third process, and the vehicle outer panel illustrated by the reference numeral 52 in FIG. 5C may be disposed as the third vehicle outer panel in the fourth process. To elaborate on FIG. 5C and explain specifically, first, in the third process, the second vehicle outer panel (54) is disposed at a position running along the first fold line (b1) so as to form the first parting portion (50b) between the second vehicle outer panel (54) and the third outer panel configuration portion (58A), and the second vehicle outer panel (54) is attached to the attachment target. Next, in the fourth process, the third vehicle outer panel (52) is disposed at a position running along the second fold line (b2) so as to form the second parting portion (50a) between the third vehicle outer panel (52) and the third outer panel configuration portion (58A) and further form the third parting portion (50c) between the third vehicle outer panel (52) and the second vehicle outer panel (54), and the third vehicle outer panel (52) is attached to the attachment target.

As a modified example of the above exemplary embodiment, the fender panel 26 illustrated in FIG. 2 may be applied as the second panel described in the first embodiment of the present invention, and the outer hood panel 24A may be applied as the third panel described in the first embodiment of the present invention.

Second Exemplary Embodiment

Figure 6A:
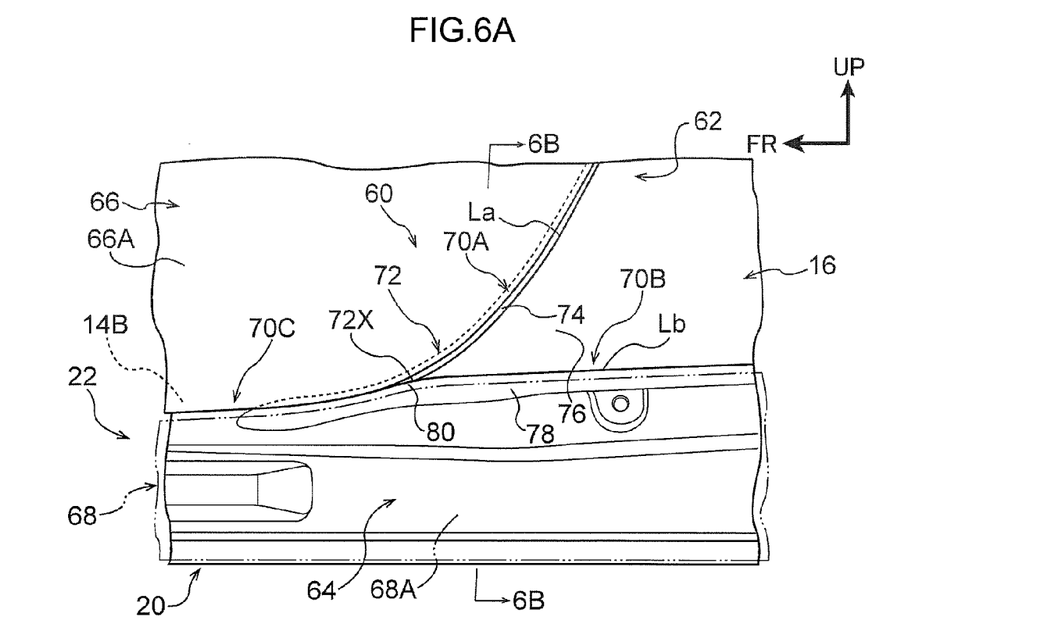
FIG. 6A is a side view illustrating a state of a vehicle lower section applied with a vehicle parting portion structure according to a second exemplary embodiment of the present invention, as viewed from the vehicle width direction outside.
Figure 6B:
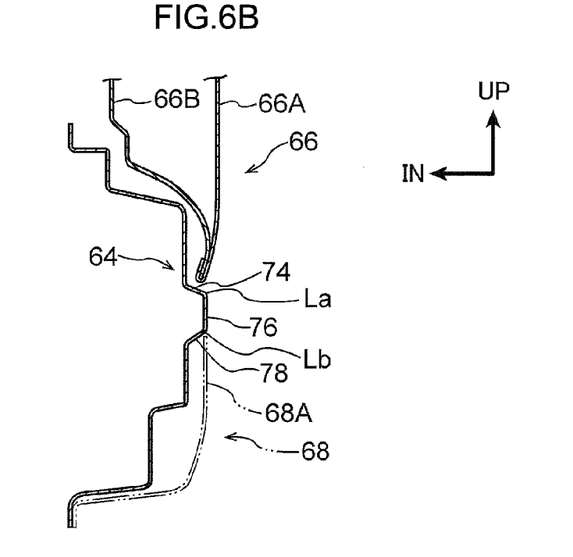
FIG. 6B is a cross-section taken along line 6B-6B in FIG. 6A.

Explanation follows regarding a vehicle parting portion structure 60 according to a second exemplary embodiment of the present invention, with reference to FIG. 6A and FIG. 6B.

Note that the same reference numerals are appended to similar configuration portions to the first exemplary embodiment, and explanation is omitted. FIG. 6A is a side view illustrating a state viewed from the vehicle width direction outside of a rear portion of a vehicle lower section 20 to which the vehicle parting portion structure 60 according to the present exemplary embodiment is applied. FIG. 6B is a cross-section taken along line 6B-6B in FIG. 6A. Brief explanation first follows regarding a vehicle structure including the vehicle parting portion structure 60.

Vehicle Parting Portion Structure

As illustrated in FIG. 6A, a rear side door opening 14B is formed at a rear portion of the side member outer panel 16. A rear lower portion of the rear side door opening 14B is positioned at the front side of a rear wheel, not illustrated in the drawings, slopes toward the vehicle upper side while heading toward the vehicle rear side, and curves so as to inflect toward the vehicle rear lower side. A portion at the rear side of the rear side door opening 14B of the side member outer panel 16 configures an outer panel portion of a rear pillar 62. The rear pillar 62 slopes toward the vehicle upper side while heading toward the vehicle rear side. An upper end portion of the rear pillar 62 is joined to a rear end portion of a roof side rail portion (not illustrated in the drawings). A lower end portion of the rear pillar 62 is joined to a rear end portion of the rocker portion 22.

A lower portion of the side member outer panel 16 configures an outer panel portion of the rocker portion 22, and part of the outer panel portion of the rocker portion 22 is positioned at the lower side of the rear side door opening 14B. The side member outer panel 16 includes a side wall portion 64 serving as part of the outer panel portion of the rocker portion 22.

A lower end portion of a rear side door 66 is disposed at the vehicle width direction outside of an upper portion of the side wall portion 64 (see FIG. 6B). The rear side door 66 forms an opening-closing door that opens and closes the rear side door opening 14B previously described. As illustrated in FIG. 6B, the rear side door 66 is configured including an outer door panel 66A serving as a second panel configuring an outer panel, and an inner door panel 66B disposed at the vehicle cabin side of the door outer panel 66A, and configuring an inner panel of the rear side door 66. An outer peripheral portion of the outer door panel 66A is joined to the inner door panel 66B by hemming processing. A front end portion at the vehicle front side of the rear side door 66 is attached to a center pillar (not illustrated in the drawings) by a door hinge portion (not illustrated in the drawings).

As illustrated in FIG. 6A and FIG. 6B, a rocker molding 68 made from resin and serving as a third panel at the vehicle width direction outside of a lower portion of the rocker portion 22 is attached by clips (not illustrated in the drawings) to the side member outer panel 16. Note that in FIG. 6A and FIG. 6B, only the external shape of the rocker molding 68 is illustrated by a double-dotted dashed line, and in FIG. 6A the rocker portion 22 of the side member outer panel 16 is illustrated with the rocker molding 68 shown in a transparent state. As illustrated in FIG. 6B, a side wall portion 68A of the rocker molding 68 is formed with a gap in the vehicle width direction with respect to a lower portion of the side wall portion 64 of the side member outer panel 16.

Detailed explanation follows regarding the vehicle parting portion structure 60.

As illustrated in FIG. 6A, the side member outer panel 16 includes a corner portion 72 having an acute angle at the rear side of a rear lower portion of the rear side door opening 14B. The corner portion 72 is formed interposed between a first ridge line La sloping toward the vehicle lower side while heading to the vehicle front side, and a second ridge line Lb extending in the vehicle front-rear direction and intersecting with the first ridge line La so as to form an acute angle therebetween.

The first ridge line La forms a boundary portion between a first panel portion 74 disposed at an upper face of the rear lower portion of the rear side door opening 14B (see FIG. 6B), and a second panel portion 76 disposed as a side face at the rear side of the rear side door opening 14B (see FIG. 6B). In other words, a bent shape is formed by the first panel portion 74 and the second panel portion 76. Note that in the present exemplary embodiment, the first ridge line La forms a curved line inflecting toward the vehicle rear lower side, not a straight line. The first panel portion 74 slopes toward the vehicle lower side while heading to the vehicle front side, inflects toward the vehicle rear lower side, and the panel face thereof faces at an angle toward the vehicle upper front side. The second panel portion 76 is formed contiguously to the first panel portion 74 with the first ridge line La interposed therebetween, and the panel face thereof substantially faces the vehicle width direction outside.

The second ridge line Lb forms a boundary line between the second panel portion 76 previously described and a third panel portion 78 disposed at the lower side of the second panel portion 76 (see FIG. 6B). In other words, a bent shape is formed by the second panel portion 76 and the third panel portion 78. The third panel portion 78 is formed contiguously to the second panel portion 76 with the second ridge line Lb interposed therebetween, extends substantially in the vehicle front-rear direction, and the panel face thereof faces the vehicle width direction outside angled toward the vehicle lower side.

The side member outer panel 16 includes a bead 80 extending from an intersection point 72X of the first ridge line La and the second ridge line Lb toward the vehicle front side. The bead 80 is configured by part of the first panel portion 74 and part of the third panel portion 78, forms a V shaped cross-section, and extends along the extension direction of the second ridge line Lb. An apex portion ridge line of the bead 80 is gradually positioned toward the vehicle width direction inside on progression away from the intersection point 72X of the first ridge line La and the second ridge line Lb. Namely, the protruding direction height of the bead 80 gradually decreases on progression away from the intersection point 72X of the first ridge line La and the second ridge line Lb.

A rear lower portion of the outer door panel 66A of the rear side door 66 is disposed running along the first ridge line La, and forms a first parting portion 70A between the door outer panel 66A and the second panel portion 76 of the side member outer panel 16. A rear end portion at an upper end portion of the rocker molding 68 is disposed along the second ridge line Lb, and forms a second parting portion 70B between the rocker molding 68 and the second panel portion 76 of the side member outer panel 16. As previously described, the upper end portion of the rocker molding 68 at a location further to the front side from the rear end portion thereof forms a third parting portion 70Cb with the outer door panel 66A of the rear side door 66.

Manufacturing Method, Operation, and Advantageous Effects

Explanation follows regarding a method of manufacturing the vehicle parting portion structure of the present exemplary embodiment, as well as operation and advantageous effects of the above exemplary embodiment.

The method of manufacturing the vehicle parting portion structure of the present exemplary embodiment is similar to the method of manufacturing illustrated in FIG. 5A to FIG. 5C, serving as a modified example of the first exemplary embodiment. Regarding the third process and the fourth process, either of the two patterns illustrated as the modified examples of the first exemplary embodiment may be applied.

Supplementary explanation follows regarding the corresponding relationships between the configuration portions illustrated in FIG. 5C and the configuration portions illustrated in FIG. 6A, with reference to FIG. 5C and FIG. 6A. The second vehicle outer panel 52 in FIG. 5C corresponds to the outer door panel 66A in FIG. 6A, and the third vehicle outer panel 54 in FIG. 5C corresponds to the rocker molding 68 in FIG. 6A. The first outer panel configuration portion 57 in FIG. 5C corresponds to the third panel portion 78 in FIG. 6A, the third outer panel configuration portion 58A in FIG. 5C corresponds to the second panel portion 76 in FIG. 6A, and the fourth outer panel configuration portion 58B in FIG. 5C corresponds to the first panel portion 74 in FIG. 6A. The first fold line b1 in FIG. 5C corresponds to the second ridge line Lb in FIG. 6A, the second fold line b2 in FIG. 5C corresponds to the first ridge line La in FIG. 6A, the corner portion 56C in FIG. 5C corresponds to the corner portion 72 in FIG. 6A, and the bead 59 in FIG. 5C corresponds to the bead 80 in FIG. 6A.

A portion at the rear side of the rear lower portion of the rear side door opening 14B of the side member outer panel 16 illustrated in FIG. 6A is accordingly processed by bend processing so as to form the acute angle shaped corner portion 72 interposed between the first ridge line La and the second ridge line Lb. This enables a hole shaped gap to be prevented from forming between the side member outer panel 16, the outer door panel 66A and the rocker molding 68, at the vicinity of the intersection point 72X of the first ridge line La and the second ridge line Lb.

The excellent external appearance is accordingly secured without covering the location at the rear side of the lower end portion of the rear side door opening 14B of the side member outer panel 16 with a cover. Since no cover is required, there is no need to reduce the depth dimension at the forming location of the corner portion 72 of the side member outer panel 16 as viewed from the second panel portion 76 as the apex. In other words, there is no need to form a cross-section shape that would reduce the strength at the forming location of the corner portion 72 of the side member outer panel 16. This enables a specific strength at this location to be easily secured.

In the vehicle parting portion structure 60 of the present exemplary embodiment, the bead 80 extends along the extension direction of the second ridge line Lb. As a result, even if the bead 80 is visible in the gap at the third parting portion 70C between the outer door panel 66A and the rocker molding 68, the bead 80 appears as a line that is contiguous to the second ridge line Lb. Namely, the bead 80 can be presented as a part of the styling, creating a good appearance.

As explained above, the present exemplary embodiment enables the external appearance to be improved, while securing a specific strength for the parting portion structure 60 of the manufactured vehicle. The present exemplary embodiment also enables flexibility for styling to be increased.

Modified Examples of Second Exemplary Embodiment

Explanation follows regarding modified examples of the second exemplary embodiment.

In the above exemplary embodiment, the bead 80 extends along the extension direction of the second ridge line Lb; however the bead may be a bead that extends along the extension direction of the first ridge line (La). In order to realize such a configuration, the folding sequence in the manufacturing method of the above exemplary embodiment may be reversed, as illustrated in FIG. 4A to FIG. 4C. Regarding the third process and the fourth process, either of the two patterns illustrated as the modified examples of the first exemplary embodiment may be applied.

Supplementary explanation follows regarding the corresponding relationships between the configuration portions illustrated in FIG. 4C and the configuration portions illustrated in FIG. 6A, with reference to FIG. 4C and FIG. 6A. The first outer panel configuration portion 44 in FIG. 4C corresponds to the first panel portion 74 in FIG. 6A, the third outer panel configuration portion 46A in FIG. 4C corresponds to the second panel portion 76 in FIG. 6A, and the fourth outer panel configuration portion 46B in FIG. 4C corresponds to the third panel portion 78 in FIG. 6A. The first fold line B1 in FIG. 4C corresponds to the first ridge line La in FIG. 6A, the second fold line B2 in FIG. 4C corresponds to the second ridge line Lb in FIG. 6A, and the corner portion 42C in FIG. 4C corresponds to the corner portion 72 in FIG. 6A.

As a modified example of the second exemplary embodiment, the rocker molding 68 may be applied as the second panel described in the first exemplary embodiment of the present invention, and the outer door panel 66A may be applied as the third panel described in the first exemplary embodiment of the present invention Supplementary Explanation of Exemplary Embodiments The exemplary embodiments and the plural modified examples described above may be combined and implemented as appropriate.

Examples of the present invention have been given above, however the present invention is not limited to the above, and obviously various modifications may be implemented within a range not departing from the scope of the invention.

The entire contents of the disclosure of Japanese Patent Application No. 2012-232036 are incorporated by reference in the present specification.

The invention claimed is:

1. A vehicle parting portion structure comprising:
   a first panel that includes:
      a first panel portion,
      a second panel portion formed contiguously to the first panel portion with a first ridge line interposed therebetween,
      a third panel portion formed contiguously to the second panel portion with a second ridge line intersecting the first ridge line at an acute angle interposed therebetween, and
      a bead having a V shaped cross-section, configured by part of the first panel portion and part of the third panel portion, and including an apex ridge line extending from an intersection point of the first ridge line and the second ridge line, wherein the height of the bead gradually decreases as the apex ridge line progresses away from the intersection point;
   a second panel that is disposed along the first ridge line with a first parting portion formed between the second panel and the second panel portion; and
   a third panel that is disposed along the second ridge line with a second parting portion formed between the third panel and the second panel portion, and with a third parting portion formed between the third panel and the second panel, wherein the V shaped cross-section of the bead is disposed at a corner portion that is formed by the second panel and the third panel at a location where the first parting portion and the second parting portion meet.

2. The vehicle parting portion structure of claim 1, wherein the bead extends along an extension direction of the first ridge line or the second ridge line.

3. The vehicle parting portion structure of claim 1, wherein:
   the first panel forms a side member outer panel configuring a vehicle body side section, the second panel forms a hood panel covering a vehicle front portion from the upper side, and the third panel forms a fender panel disposed at a side face of a vehicle body front section.

4. A method of manufacturing a vehicle parting portion structure, the method comprising:
   a first process of folding a first vehicle outer panel member to form a first outer panel configuration portion and a second outer panel configuration portion with a first fold line interposed therebetween;
   a second process of folding the second outer panel configuration portion along a line intersecting the first fold line at an acute angle to form a third outer panel configuration portion by part of the second outer panel configuration portion between a second fold line along the line and the first fold line, and to form a fourth outer panel configuration portion by another part of the second outer panel configuration portion such that the fourth outer panel configuration portion is contiguous to the third outer panel configuration portion with the second fold line interposed therebetween, a V shaped bead being formed by a portion of the first outer panel configuration portion and a portion of the fourth outer panel configuration portion such that the bead has a ridge line extending from a point at which the first folding line and the second folding line meet;
   a third process of disposing a second vehicle outer panel along one of the first fold line or the second fold line and at a position forming a first parting portion between the second vehicle outer panel and the third outer panel configuration portion; and
   a fourth process of disposing a third vehicle outer panel along the other of the first fold line or the second fold line and at a position forming a second parting portion between the third vehicle outer panel and the third outer panel configuration portion, and at a position further forming a third parting portion between the third vehicle outer panel and the second vehicle outer panel, an acute angle corner portion being formed at a location at which the first parting portion and the second parting portion meet, and the bead being disposed at the acute ankle corner portion.

5. The vehicle parting portion structure of claim 2, wherein:
   the first panel forms a side member outer panel configuring a vehicle body side section, the second panel forms a hood panel covering a vehicle front portion from the upper side, and the third panel forms a fender panel disposed at a side face of a vehicle body front section.

* * * * *